(12) United States Patent
Hecht

(10) Patent No.: US 9,597,737 B2
(45) Date of Patent: Mar. 21, 2017

(54) TOOL COUPLING ARRANGEMENT FOR DRILLS AND REAMERS

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 14/696,989

(22) Filed: Apr. 27, 2015

(65) Prior Publication Data

US 2016/0311036 A1    Oct. 27, 2016

(51) Int. Cl.
*B23B 51/06*    (2006.01)
*B23D 77/02*    (2006.01)
(Continued)

(52) U.S. Cl.
CPC ............ *B23B 51/06* (2013.01); *B23B 31/005* (2013.01); *B23B 51/0486* (2013.01); *B23D 77/006* (2013.01); *B23D 77/02* (2013.01); *B23B 2231/0204* (2013.01); *B23B 2250/12* (2013.01); *B23B 2251/02* (2013.01); *B23B 2251/424* (2013.01); *B23D 2277/02* (2013.01); *B23D 2277/06* (2013.01); *B23D 2277/60* (2013.01)

(58) Field of Classification Search
CPC .......... B23B 2260/034; B23B 2251/02; B23D 2277/06
See application file for complete search history.

(56) References Cited

U.S. PATENT DOCUMENTS 2,383,688 A * 8/1945 Seiter ............... B23B 51/04
279/8
4,621,960 A * 11/1986 Tollner .............. B23B 31/00
279/102
(Continued)

FOREIGN PATENT DOCUMENTS

DE    202014103552 U1 * 8/2014    ............ B23B 31/02
JP    03-149114 A    * 6/1991    ............... B23C 5/10
(Continued)

OTHER PUBLICATIONS

International Search Report dated Aug. 3, 2016, issued in PCT counterpart application (No. PCT/IL2016/050387.
(Continued)

*Primary Examiner* — Sunil K Singh
*Assistant Examiner* — Ryan Rufo
(74) *Attorney, Agent, or Firm* — Womble Carlyle

(57) ABSTRACT

A tool coupling arrangement for drills and reamers includes tool and shank portions with respective tool and shank axial stoppers. An at least partially cylindrical tool coupling end of the tool portion is located within a longitudinal through forward bore portion in the shank portion, and being coupled therein via an elongated coupling member located further inwards in the shank portion and comprising axially opposite member coupling and pulling ends. The forward bore portion has front and rear sub-portions and a bore recess which is located therebetween and extends radially outwardly. In a locked position, the tool axial stopper abuts the shank axial stopper. The tool coupling end abuts the front and rear sub-portions. And the member coupling end is wedged between the tool coupling end and the bore recess.

19 Claims, 3 Drawing Sheets

(51) Int. Cl.
*B23D 77/00* (2006.01)
*B23B 31/00* (2006.01)
*B23B 51/04* (2006.01)

(56) References Cited

U.S. PATENT DOCUMENTS

| | | | | |
|---|---|---|---|---|
| 4,929,131 | A * | 5/1990 | Allemann | B23B 31/1075 |
| | | | | 279/8 |
| 4,958,965 | A * | 9/1990 | Strand | B23B 31/1107 |
| | | | | 279/89 |
| 5,851,094 | A * | 12/1998 | Strand | B23B 31/1107 |
| | | | | 279/20 |
| 5,964,555 | A * | 10/1999 | Strand | B23B 31/1107 |
| | | | | 279/93 |
| 6,394,711 | B1 * | 5/2002 | Brosius | B23C 5/10 |
| | | | | 279/8 |
| 6,503,027 | B2 * | 1/2003 | Men | B23C 5/10 |
| | | | | 407/33 |
| 6,976,815 | B2 | 12/2005 | Berglöw et al. | |
| 7,207,755 | B2 * | 4/2007 | Berglow | B23C 5/10 |
| | | | | 407/11 |
| 8,511,948 | B2 * | 8/2013 | Guy | B23B 31/113 |
| | | | | 279/93 |
| 2001/0009636 | A1 | 7/2001 | Men | |
| 2003/0210963 | A1 * | 11/2003 | Kakai | B23B 31/008 |
| | | | | 408/231 |
| 2004/0223817 | A1 * | 11/2004 | Berglow | B23C 5/10 |
| | | | | 407/34 |
| 2006/0051174 | A1 * | 3/2006 | Pantzar | B23C 5/10 |
| | | | | 409/234 |
| 2006/0257215 | A1 * | 11/2006 | Kakai | B23B 31/11 |
| | | | | 407/101 |
| 2007/0196188 | A1 * | 8/2007 | Hecht | B23B 31/11 |
| | | | | 408/233 |
| 2011/0211921 | A1 | 9/2011 | Volokh | |

FOREIGN PATENT DOCUMENTS

| | | | | |
|---|---|---|---|---|
| JP | 2003200311 A | | 7/2003 | |
| JP | 2003-251515 A | * | 9/2003 | ............... B23C 5/10 |
| JP | 2008023607 A | | 2/2008 | |

OTHER PUBLICATIONS

Written Opinion dated Aug. 3, 2016, issued in PCT counterpart application (No. PCT/IL2016/050387).

* cited by examiner

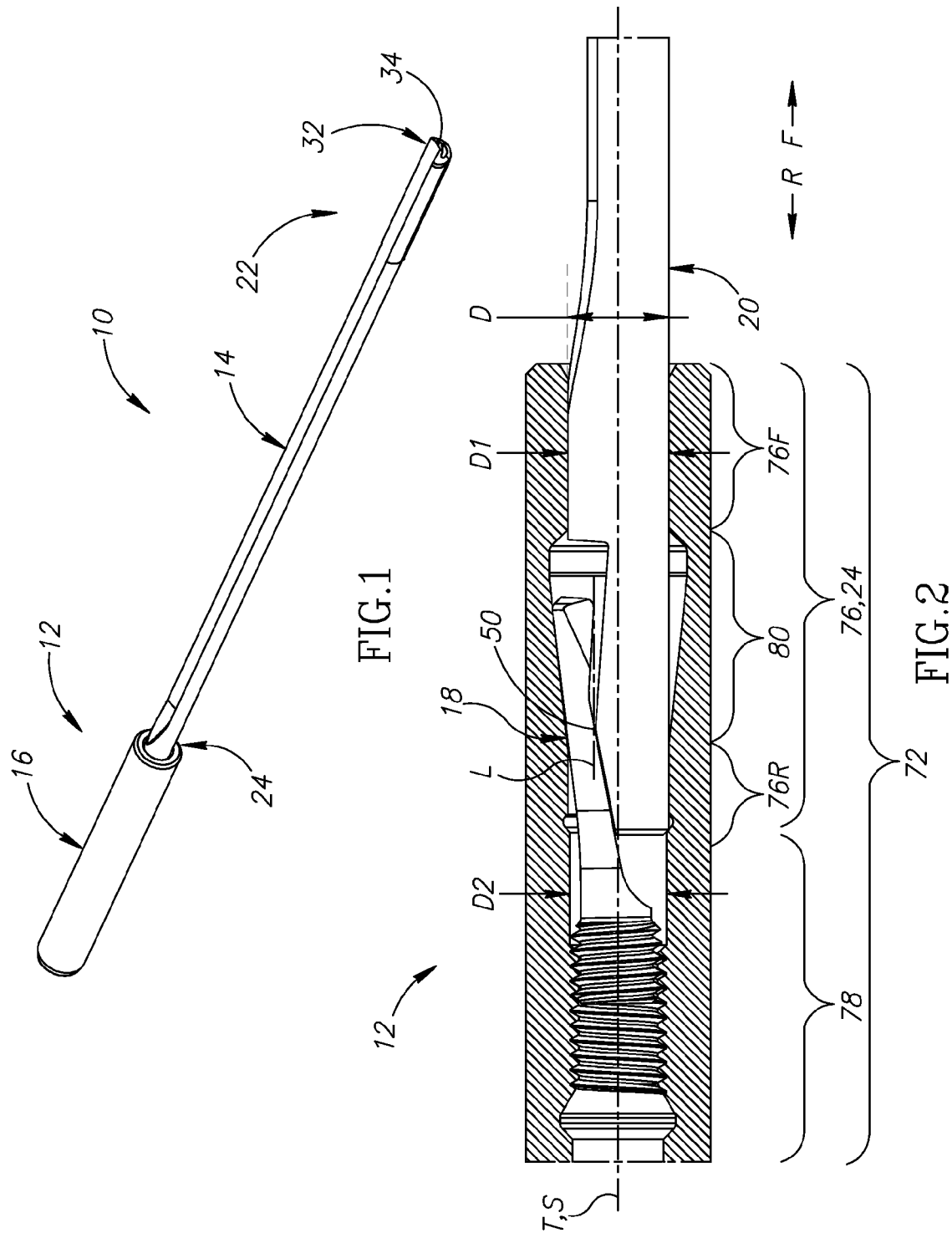

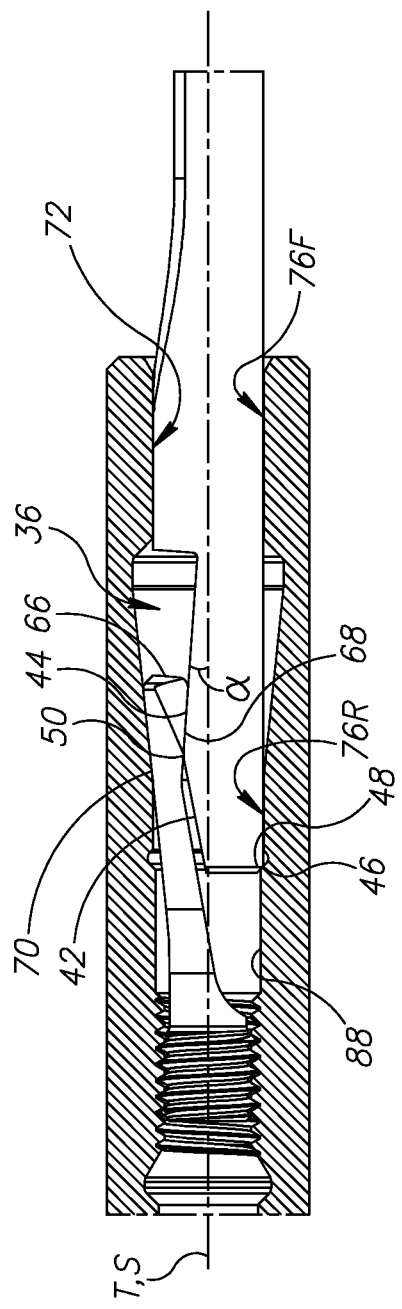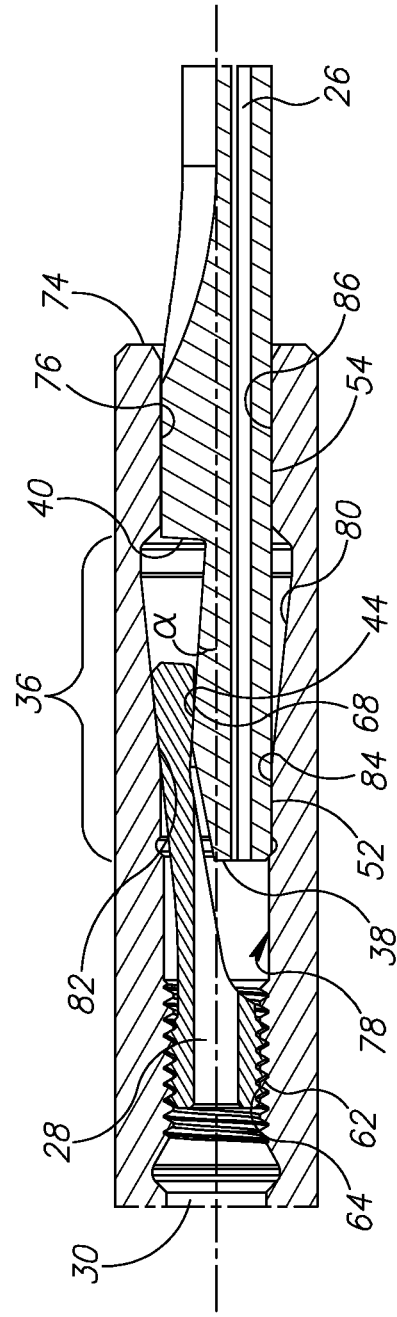

TOOL COUPLING ARRANGEMENT FOR DRILLS AND REAMERS

FIELD OF THE INVENTION

The subject matter of the present application relates to tools such as drills and reamers, and particularly axial coupling arrangements between two portions of a drill or a reamer.

BACKGROUND OF THE INVENTION

U.S. Pat. No. 6,976,815 discloses a milling cutter which includes a body having three cutting edges formed by the body. An end of the body situated opposite the cutting edges defines a fastening end of the milling cutter. The milling cutter includes a first conical shank with a hook-shaped coupler, which includes a first shoulder as well as a first recess. The milling cutter further includes a second conical portion, which is provided with a second coupler, which is intended to cooperate with the first coupler. Inside the second coupler, in the axial direction, the locking screw has an externally threaded, preferably cylindrical portion. This coupling arrangement is based on the concept of conical surfaces, which provide centering axial location and torque transfer between the two portions of the milling cutter. The conical surfaces of the male and female portions have continuous abutment areas. In order to achieve appropriate accuracies, the conical surfaces need to be ground, which may be expensive. The angle of the conical surfaces with respect to the rotation axis, may affect the thickness of the walls, and their ability to withstand machining forces. In other words, it may be difficult to make the angle small enough to increase accuracy, or make it too large to strengthen the conical seat. Furthermore, the length of the coupling region (also affected by the abovementioned angle) is relatively short compared to a diameter measured at the opening, or end surface, of the conical seat, which may negatively affect throw during machining.

SUMMARY OF THE INVENTION

In accordance with a first aspect of the subject matter of the present application there is provided a coupling arrangement for drills and reamers comprising tool and shank portions with respective tool and shank axial stoppers, an at least partially cylindrical tool coupling end of the tool portion being located within a longitudinal through forward bore portion in the shank portion, and being coupled therein via an elongated coupling member located further inwards in the shank portion and comprising axially opposite member coupling and pulling ends;

wherein the forward bore portion comprises axially-separate cylindrical front and rear sub-portions and a bore recess which is located therebetween and extends radially outwardly; and wherein in a locked position, the tool axial stopper abuts the shank axial stopper, the tool coupling end abuts the front and rear sub-portions, and the member coupling end is wedged between the tool coupling end and the bore recess.

Any of the following features, either alone or in combination, may be applicable to any of the above aspects of the subject matter of the application:

The tool and shank portions can include parallel respective tool and shank axes (T, S).

The forward bore portion opens out to a shank forward surface, and the bore recess increases in depth in a longitudinal direction towards the shank forward surface.

The bore recess can be conical.

The bore recess can extend 360 degrees about a longitudinal shank axis S.

The bore recess includes a first bore abutment surface and the rear and front sub-portions include respective second and third bore abutment surfaces; and the first bore abutment surface can be located radially opposite the second and third bore abutment surfaces, while being axially spaced from at least the third bore abutment surface.

The tool coupling end has a planar first tool abutment surface which abuts a planar inner abutment surface of the member coupling end.

The member coupling end includes radially opposite inner and outer abutment surfaces.

The inner abutment surface can be planar and the outer abutment surface can be conical.

The inner and outer abutment surfaces converge towards the member pulling end.

Each of the tool and member coupling ends is asymmetric.

In the axial direction, the tool coupling end abuts the inner abutment surface between two axially separate sides of the bore recess.

The member pulling end can include a male thread which is screw threaded into a female thread located in a rearward bore portion of the shank portion.

The tool coupling end can have a planar first tool abutment surface which forms an abutment angle ($\alpha$) with the tool axis (T) in the range of 0 to 45 degrees.

The abutment angle ($\alpha$) is in the range of 0 to 20.

The tool portion, the coupling member and the shank portion include, respectively, a tool cooling duct, a member cooling duct and shank cooling duct.

In the locked position, the tool coupling end has a tool coupling length (LN) and a tool diameter (D) measured at a shank forward surface; and wherein the tool coupling end has a length-diameter ratio (RT)=(LN/D)>2.

In the locked position, no portion of the tool coupling end abuts the bore recess.

BRIEF DESCRIPTION OF THE DRAWINGS

For a better understanding of the subject matter of the present application and to show how the same may be carried out in practice, reference will now be made to the accompanying drawings, in which:

FIG. 1 is an isometric view of an assembled drill showing drill and shank portions;

FIG. 2 is a side view of a coupling arrangement of the drill of FIG. 1, in an assembled position, with the shank portion partially cut to show a coupling member and a tool coupling end;

FIG. 3 is a side view of the coupling arrangement of FIG. 2, in a locked position, after rotating the drill portion relative the shank portion;

FIG. 4 is a cross section of the coupling arrangement of FIG. 3.

Figure 6:
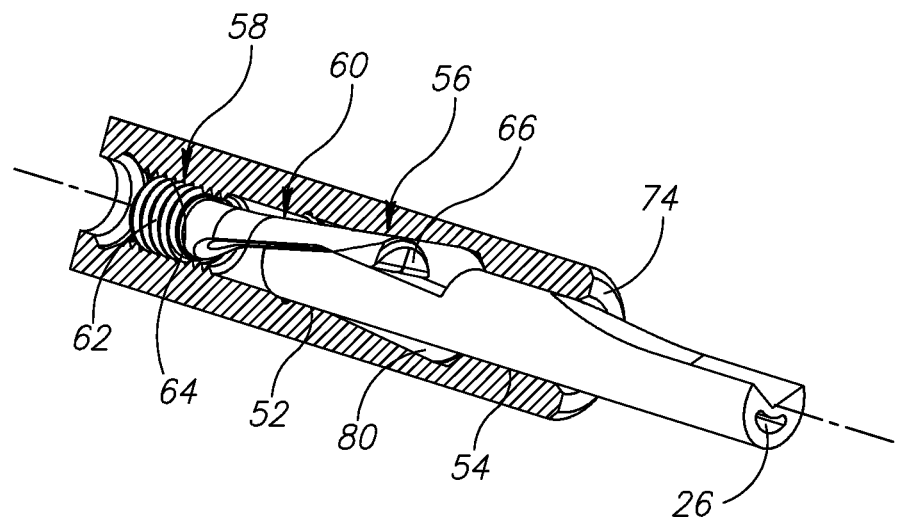
FIG. 6 is a second isometric view of the coupling arrangement of FIG. 3.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Reference is made to FIGS. 1-2. A drill 10 has a coupling arrangement 12 which includes tool and shank portions 14, 16, coupled together via an internal, elongated coupling member 18. The assembled drill 10 defines a forward-to-rear direction (F, R) as defined by the arrows in FIG. 2. In order to assemble the drill 10, the tool portion 14 is axially inserted into the shank portion 16 until the coupling arrangement 12 reaches an assembled position. The tool portion 14 is then rotated axially with respect to the shank portion 16 until a locked position is achieved. The tool portion 14 can be formed out of a wear resistant material such as cemented carbide. The shank portion 16 can be formed of steel.

The tool portion 14 has a longitudinal tool axis T and an external tool peripheral surface 20. The tool peripheral surface 20 can extend between opposite tool cutting and coupling ends 22, 24 of the tool portion 14. The tool peripheral surface 20 is cylindrical at least at the tool coupling end 24. The tool peripheral surface 20 has a tool diameter D at the tool coupling end 24. The tool portion 14 can include a tool cooling duct 26 which extends longitudinally therethrough and opens out at the tool cutting and coupling ends 22, 24.

At the tool cutting end 22, the tool portion 14 includes a machining head 32 which, e.g., can be a replaceable, or integrated (being of unitary, one piece construction) part of the tool portion 14. The cutting end 22 can made of cemented carbide. It is noted that the machining head 32 can be a reaming head, or drill head. The machining head 32 has cutting edges 34 arranged thereon according to the desired machining application. According to the present embodiment, the drill 10 is a gun-drill type drill, which has a single cutting edge 34.

Figure 5:
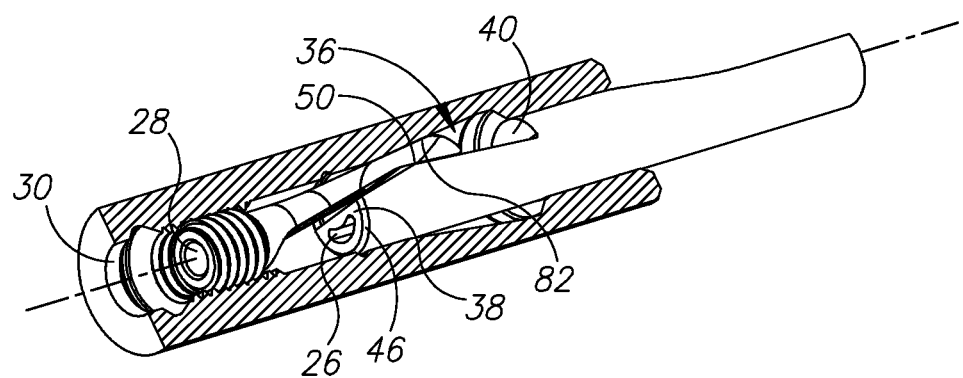
FIG. 5 is a first isometric view of the coupling arrangement of FIG. 3.

Attention is drawn to FIG. 2-5. The tool coupling end 24 is asymmetric in a width direction. The tool coupling end 24 includes a tool rear surface 38, a cutout region 36 in the tool peripheral surface 20 and second and third abutment surfaces 52, 54 located also on the peripheral surface 20. The tool rear surface 38 is oriented transversely to the tool axis T. The tool coupling end 24 extends (axially) between the tool rear surface 38 and the third abutment surface 54 (as shown in FIG. 4), and defines a tool coupling length LN in the locked position. The cutout region 36 extends (axially) between the tool rear surface 38 and a step surface 40. The cutout region 36 includes a guide surface 42, a first tool abutment surface 44, the step surface 40 and a tool axial stopper 46. This is advantageous, since the cutout region 36 is relatively cheap to produce, with only a very few passes of a grinding wheel (in the present embodiment—one pass of grinding wheel with an adapted profile).

The tool axial stopper 46 can extend between the tool rear surface 38 and the tool peripheral surface 20. The tool axial stopper 46 can be a chamfered conical surface. The guide surface 42 can extend from the tool axial stopper 46, or the tool rear surface 38, transversely to the tool axis T, towards the tool cutting end 22. The guide surface 42 meets with the first tool abutment surface 44 at a crest 50. When the tool portion 14 is inserted into the shank portion 16, the guide surface 42 is configured to engage the coupling member 18, and guide it, or allow it to slide thereon, until it passes the crest 50, and the coupling arrangement 12 reaches the assembled position (as will be explained below).

The first tool abutment surface 44 can be planar. The first tool abutment surface 44 can extend from the guide surface 42 towards the tool cutting end 22 and connect with the step surface 40. The step surface 40 meets with the tool peripheral surface 20. The first tool abutment surface 44 forms an abutment angle $\alpha$ with the tool axis T in the range of between 0 to 45 degrees. Advantageously, the abutment angle $\alpha$ is in the range of between 0 to 20 degrees, in order to balance between ease of use and strong coupling forces. In other words, e.g., a smaller abutment angle $\alpha$ makes it easier to insert and remove the tool coupling end 24, while a larger abutment angle $\alpha$, can help increase the axial anti-pullout forces.

The tool peripheral surface 20 includes the second and third tool abutment surfaces 52, 54. The second abutment surface 52 is located in the tool coupling end 24, adjacent the tool rear surface 38 in an axial direction. According to the present embodiment, the second tool abutment surface 52 is located opposite the guide surface 42, with respect to the tool axis T. The third tool abutment surface 54 is located in the tool coupling end 24, axially separate from the tool rear surface 38 and located farther away from the tool rear surface 38 than the second tool abutment surface 52. In the axial direction, the third tool abutment surface 54 can be located adjacent the step surface 40. According to the present embodiment, the third tool abutment surface 54 is axially located adjacent the cutout region 36 when the coupling arrangement 12 is in the locked position. The first tool abutment surface 44 is axially located between the second and third tool abutment surfaces 52, 54. The first tool abutment surface 44 is located radially opposite (e.g., circumferentially spaced by about 180°) the second and third tool abutment surfaces 52, 54, while being axially spaced from at least the third tool abutment surface 54.

Attention is drawn to FIGS. 2-6. The coupling member 18 is elongated and includes axially opposite member coupling and pulling ends 56, 58. The coupling member 18 is asymmetric in the longitudinal direction and in a width direction. The coupling member 18 includes a body section 60 which extends between the member coupling and pulling ends 56, 58.

According to the present embodiment, the member pulling end 58 includes a male thread 62, via which the coupling member 18 is pulled inwardly in the shank portion 46, to arrive from the assembled position to the locked position.

The member coupling end 56 is asymmetric in the longitudinal direction and in the width direction. The member coupling end 56 includes a member forward surface 66. The member coupling end 56 further includes inner and outer abutment surfaces 68, 70 which extend from the member forward surface 66, towards the member pulling end 58. The member coupling end 56 can have a wedge-like shape, to accurately couple the tool coupling end 24 in the shank. In other words, the inner and outer abutment surfaces 68, 70 converge towards the member pulling end 58. The inner abutment surface 68 can be planar, and the outer abutment surface 70 can be conical. The coupling member 18 can further includes a longitudinal member cooling duct 28 which opens out at the member pulling end 58 and at the member body section 60.

The shank portion 16 has a shank axis S and includes a cylindrical coupling bore 72. The shank portion 16 can include a shank cooling duct 30 which extends longitudinally therethrough. The shank portion 16 includes a shank forward surface 74 which extends transversely to the shank axis S. The coupling bore 72 opens out to the shank forward surface 74. The coupling bore 72 includes forward and rearward bore portions 76, 78 (both extending axially as shown in FIG. 2). The forward bore portion 76 opens out to the shank forward surface 74. The forward bore portion 76 extends between the shank forward surface 74 and the rearward bore portion 78.

The forward bore portion 76 is cylindrical. In order to ensure a tight fit between the tool and shank portions 14, 16, the forward bore portion 76 has a forward bore diameter D1 which is slightly larger than the tool diameter D. It is noted that within standard tolerances for shaft-hole fits, the present arrangement is configured to allow assembly by hand, while maintaining axial alignment accuracy and sliding of the tool coupling end 24 within the forward bore portion 76. According to ANSI standards, the Locational transition fit (LT) is a preferable, advantageous standard tolerance. Another advantage of the tight fit is repeatability. Specifically—of accurate parallel alignment between the tool and shank axes T, S.

Attention is drawn to FIG. 2. The forward bore portion 76 further includes a bore recess 80 which extends radially outwardly. The bore recess 80 is axially located between cylindrical front and rear sub-portions 76F, 76R (as shown at the bottom of FIG. 2). Both the front and rear sub-portions 76F, 76R have the forward bore diameter D1. The bore recess 80 is configured to allow the coupling member 18 to move out of the way of the tool coupling end 24 upon insertion or removal thereof. The bore recess 80 increases in depth (i.e., increase in cross-sectional area) when proceeding axially along the forward bore portion 76 towards the shank forward surface 74. According to the present embodiment, the bore recess 80 is conical. The conical bore recess 80 is oriented, or extends, co-axially with the shank axis S. The bore recess 80 can extend 360 degrees about the shank axis S. The bore recess 80 includes a first bore abutment surface 82. The bore recess 80 is axially spaced apart from the shank forward surface 74 by the front sub-portion 76F. The bore recess 80 is spaced apart from the rearward bore portion 76 by the rear sub-portion 76R.

The forward bore portion 76 includes second and third bore abutment surfaces 84, 86. The second bore abutment surface 84 is located in the rear sub-portion 76R. The third bore abutment surface 86 is located in the front sub-portion 76F. The first bore abutment surface 82 is located between the second and third bore abutment surfaces 84, 86 in the axial direction. The first bore abutment surface 82 is located radially opposite the second and third bore abutment surfaces 84, 86 (with respect to the shank axis S), while being axially spaced from at least the third bore abutment surface 86.

As shown in FIG. 2, the forward bore portion 76 and the tool coupling end 24 extend roughly along the same axial area, which encompasses (axially) the second and third abutment surfaces (52, 24, 84, 86). In the present coupling arrangement 12, the tool coupling length LN is considerably longer that the tool diameter D (the diameter D, as measured at the shank forward surface 74 in the assembled, or locked positions). Specifically, the tool coupling end 24 has a length-diameter ratio of $RT=LN/D>2$, and in the present embodiment $RT=LN/D>3$. This enlarged ratio is advantageous, since it can help prevent run out in the tool portion and increase coupling accuracy.

The rearward bore portion 78 is located axially further inwardly within the coupling bore 72 with respect to the forward bore portion 76. According to the present embodiment, the rearward bore portion 78 has a rearward bore diameter $D2<D<D1$. According to the present embodiment, a shank axial stopper 48 connects between the forward and rearward bore portions 76, 78. The shank axial stopper 48 can be a chamfered conical surface, which extends about the shank axis S.

The rearward bore portion 78 can include, according to the present embodiment, a female thread 64. The rearward bore portion 78 can include a relief portion which is axially located between the female thread 64 and the shank axial stopper 48.

Attention is drawn to FIG. 2. In order to reach the assembled position, the tool coupling end 24 is inserted into the coupling bore 72 until the tool axial stopper 46 abuts the shank axial stopper 48 (thus, assuring axial location of the tool portion 14 in the (final) locked position).

In this position, a loose engagement between the member and the tool coupling ends 56, 24 allows easy, or smooth, turning of both parts within the coupling bore 72. Nonetheless, the relative compact enclosure within the coupling bore 72 nearly prevents relative axial rotation between the member and tool coupling ends 56, 24. In other words, if the tool portion 14 is turned, the loose engagement becomes full contact, which transfers torque to the coupling member 18—causing it to rotate.

In the assembled position, the male thread 62 of the coupling member 18 is screwed into the female thread 64 of the rearward bore portion 78, just enough to prevent the coupling member 18 from falling out of the coupling bore 72. In this position, the coupling member 18 is not tightly screwed. This enables looseness between the male and female threads 62, 64 which enables a certain freedom of movement of the coupling member 18 relative the shank portion 16. In other words, the coupling member 18 can be pivoted about the member pulling end 58. This freedom of movement allows the member coupling end 56 to be pushed "aside" (radially outwardly) in the bore recess 80 by the tool coupling end 24 (specifically the crest 50) during insertion or removal thereof, to allow the crest 50 to pass the member forward surface 66 in the axial direction. An interference line L is drawn tangent to the crest 50, and parallel to the shank and tool axes T, S, in order to illustrate (FIG. 2) that the crest 50 can pass without interference across the member coupling end 58.

In terms of ease of use, this is advantageous, since during replacement of the tool portion 14, the user doesn't have to remove the coupling member 18 from the coupling bore 72. According to the present embodiment, only a few releaseturns of the coupling member 18 are enough to allow the abovementioned coupling member 18 pivoting, to enable easy insertion or removal of the tool coupling end 24.

Attention is drawn to FIGS. 3-6, which show the coupling arrangement 12 in the locked position. In the locked position, no portion of the tool coupling end 24 abuts the bore recess 80. In the locked position, the tool axial stopper 46 abuts the shank axial stopper 48. The outer abutment surface 70 of the coupling member 18 abuts the first bore abutment surface 82 of the bore recess 80. The first tool abutment surface 44 of the tool coupling end 24 abuts the inner abutment surface 68 of the coupling member 18. The second tool abutment surface 52 abuts the second bore abutment surface 84. The third tool abutment surface 54 abuts the third bore abutment surface 86.

According to the subject matter of the present application, the coupling arrangement 12 is transferred from the assembled position to the locked position by turning the tool portion 14 relative to the shank portion 16. Turning the tool portion 14 turns the coupling member 18 (the first tool abutment surface 44 abuts the inner abutment surface 68, thus transferring torque) which, in turn, screw-tightens the member pulling end 58 within the female thread 64, which pulls the coupling member 18 axially inwards. Due to the fact that the tool portion 14 cannot move further inwardly (the tool axial stopper 46 abuts shank axial stopper 48), the inward axial translation of the coupling member 18 further wedges the member coupling end 56 between the first bore abutment surface 82 and the first tool abutment surface 44. These abutment forces which are increased by further turning the tool portion 14 (and thus increase wedging of the coupling member 18), push the tool coupling end 24 further towards the second and third bore abutment surfaces 84, 86, thus achieving the accurate coupling and the locked position. This is advantageous, since accurate radial location of the tool portion 14 with regards to the shank portion 16 assures that the tool and shank axes T, S are parallel in the locked position. Consequently, this can minimize (or in some cases prevent) undesired throw during machining, and contributes to repeatability.

The locked position is achieved once a desired relative turning torque (between the tool and shank portions 14, 16) is reached, without causing plastic deformation to any of the coupling arrangement 12 components. As known in the field, the desired torque is defined as being larger than machining forces in respective machining applications.

What is claimed is:

1. A tool coupling arrangement (12) for drills and reamers comprising tool and shank portions (14, 16) with respective tool and shank axial stoppers (46, 48),
   an at least partially cylindrical tool coupling end (24) of the tool portion (14) being located within a longitudinal through forward bore portion (76) in the shank portion (16), and being coupled therein via an elongated coupling member (18) located further inwards in the shank portion (16) and comprising axially opposite member coupling and pulling ends (56, 58); wherein
   the forward bore portion (76) comprises axially-separate cylindrical front and rear sub-portions (76F, 76R) and a bore recess (80) which is located therebetween and extends radially outwardly relative to both the front and rear sub-portions (76F, 76R); and wherein
   in a locked position, the tool axial stopper (46) abuts the shank axial stopper (48), the tool coupling end (24) abuts the front and rear sub-portions (76F, 76R), and the member coupling end (56) abuts the tool coupling end (24) and the bore recess (80).

2. The tool coupling arrangement (12) according to claim 1, wherein the tool and shank portions (14, 16) comprise parallel respective tool and shank axes (T, S).

3. The tool coupling arrangement (12) according to claim 1, wherein the forward bore portion (76) opens out to a shank forward surface (74), and the bore recess (80) increases in depth in a longitudinal direction towards the shank forward surface (74).

4. The tool coupling arrangement (12) according to claim 1, wherein the bore recess (80) is conical.

5. The tool coupling arrangement (12) according to claim 2, wherein the bore recess (80) extends 360 degrees about a longitudinal shank axis (S).

6. The tool coupling arrangement (12) according to claim 1, wherein:
   the bore recess (80) comprises a first bore abutment surface (82) and the rear and front sub-portions (76R, 76F) comprise respective second and third bore abutment surfaces (84, 86); and
   the first bore abutment surface (82) is located radially opposite the second and third bore abutment surfaces (84, 86).

7. The tool coupling arrangement (12) according to claim 1, wherein the tool coupling end (24) has a planar first tool abutment surface (44) which abuts a planar inner abutment surface (68) of the member coupling end (56).

8. The tool coupling arrangement (12) according to claim 1, wherein the member coupling end (56) comprises radially opposite inner and outer abutment surfaces (68, 70).

9. The tool coupling arrangement (12) according to claim 8, wherein the inner abutment surface (68) is planar and the outer abutment surface (70) is conical.

10. The tool coupling arrangement (12) according to claim 8, wherein the inner and outer abutment surfaces (68, 70) converge towards the member pulling end (58).

11. The tool coupling arrangement (12) according to claim 1, wherein each of the tool and member coupling ends (24, 56) is asymmetric.

12. The tool coupling arrangement (12) according to claim 8, wherein in the axial direction, the tool coupling end (24) abuts the inner abutment surface (68) between two axially separate sides of the bore recess (80).

13. The tool coupling arrangement (12) according to claim 1, wherein the member pulling end (58) comprises a male thread (62) which is screw threaded into a female thread (64) located in a rearward bore portion (78) of the shank portion (16).

14. The tool coupling arrangement (12) according to claim 1, wherein the tool coupling end (24) has a planar first tool abutment surface (44) which forms an abutment angle ($\alpha$) with the tool axis (T) in the range of 0 to 45 degrees.

15. The tool coupling arrangement (12) according to claim 14, wherein the abutment angle ($\alpha$) is in the range of 0 to 20.

16. The tool coupling arrangement (12) according to claim 1, wherein the tool portion (14), the coupling member (18) and the shank portion (16) include, respectively, a tool cooling duct (26), a member cooling duct (28) and shank cooling duct (30).

17. The tool coupling arrangement (12) according to claim 1, wherein in the locked position, the tool coupling end (24) has a tool coupling length (LN) and a tool diameter (D) measured at a shank forward surface (74); and wherein the tool coupling end (24) has a length-diameter ratio (RT)=(LN/D)>2.

18. The tool coupling arrangement (12) according to claim 1, wherein in the locked position, no portion of the tool coupling end (24) abuts the bore recess (80).

19. A drill or reamer having a forward-to-rear direction (F, R) and comprising a tool portion (14), a shank portion (16), and an elongated coupling member (18), wherein:
   the shank portion (16) comprises:
      a longitudinally extending cylindrical forward bore portion (76) comprising a radially outwardly extending bore recess (80) formed therein, and
      a shank axial stopper (48);

the tool portion (14) comprises a cutting end (22), a tool coupling end (24) and a tool axial stopper (46);

the elongated coupling member (18) comprises axially opposite member coupling and pulling ends (56, 58);

the tool coupling end (24) is located within the forward bore portion (76) and the coupling member (18) is located further rearward inwards in the shank portion (16);

in a locked position:
  the tool axial stopper (46) abuts the shank axial stopper (48);

the tool coupling end (24) abuts the forward bore portion (76) at two axially separate areas on either side of the bore recess (80);

no portion of the tool coupling end (24) abuts the bore recess (80); and the member coupling end (56) of the coupling member (18) abuts both the tool coupling end (24) and the bore recess (80).

\* \* \* \* \*